United States Patent [19]
Lock et al.

[11] 3,884,640
[45] May 20, 1975

[54] APPARATUS TO ANALYZE FLUIDS
[75] Inventors: Richard G. Lock, Albany; John F. Wilfore, Schenectady, both of N.Y.
[73] Assignee: General Electric Company, Milwaukee, Wis.
[22] Filed: Oct. 26, 1972
[21] Appl. No.: 301,145

[52] U.S. Cl. ............ 23/253 R; 23/230 R; 23/230 B; 324/30 R
[51] Int. Cl. .................. G01n 27/42; G01n 31/00; G01n 33/16
[58] Field of Search .......... 23/253 R, 230 B, 230 R; 324/29, 30 R, 30 B, 30 C

[56] References Cited
UNITED STATES PATENTS

| | | | |
|---|---|---|---|
| 3,424,557 | 1/1969 | Skeggs | 23/253 R |
| 3,556,950 | 1/1971 | Dahms | 23/253 R X |
| 3,639,829 | 2/1972 | Harnoncourt | 324/30 R |
| 3,648,159 | 3/1972 | Stansell et al. | 23/230 B X |
| 3,763,422 | 10/1973 | MacPhee et al. | 23/230 B |

OTHER PUBLICATIONS
"A New Electrode System for Continuous Measurement of pH, $PCO_2$, $PO_2$ and Temperature on Flowing Blood," – Buzza et al. in Association for the Advancement of Medical Instrumentation Journal; Vol. 4; No. 4; July–Aug. 1970; pp. 136–144.

Primary Examiner—Barry S. Richman
Assistant Examiner—Michael S. Marcus
Attorney, Agent, or Firm—Thomas J. Bird; George B. Finnegan; Edward A. Hedman

[57] ABSTRACT

An apparatus for measuring at least two of the following characteristics of a fluid; pH, partial pressure of dissolved gas or gases therein, inorganic ion concentration, hemoglobin, temperature, and the like, the apparatus comprising a vessel having a flow channel for fluid passing therethrough and means for inducing turbulence in the channel at specified locations; sensors for the above enumerated fluid characteristics located in the vessel along the channel and within the area of induced turbulent flow; and integral heat-exchanging means e.g., cartridge heaters, within the vessel and external solid state circuitry for maintaining or achieving a preselected temperature in a fluid passing through the vessel and in the sensors. Also disclosed is such an apparatus adapted to the analysis of very small quantities of fluids, e.g., blood, including components for sample storage and transfer, preheating, propulsion and electronic read out and display.

25 Claims, 9 Drawing Figures

APPARATUS TO ANALYZE FLUIDS

This invention relates to an apparatus for the analysis of fluids. More particularly, it is concerned with an apparatus for measuring at least two of the following characteristics of a fluid: pH, partial pressure of dissolved gas or gases therein, inorganic ion concentration, hemoglobin, temperature, and the like.

BACKGROUND OF THE INVENTION

A number of instruments have been developed commercially to directly measure the hydrogen ion content (pH), partial pressure of carbon dioxide ($P_{CO_2}$), partial pressure of oxygen ($P_{O_2}$), sodium ion concentration, potassium ion concentration, hemoglobin content, sugar content, temperature, and similar characteristics of in vitro macro and micro samples of blood, urine, and other physiological fluids. Such measurements provide valuable information to physicians in the diagnosis and treatment of cardio-pulmonary diseases and aid in surgery, pulmonary function studies, cardiac catheterization, diabetes diagnosis, renal function studies, anesthesia studies, and the like.

Most commercial instruments determine the pH, $P_{CO_2}$, $P_{O_2}$, [$Na^+$], [$K^+$], hemoglobin, sugar, etc., via various electrochemical sensing mechanisms and the temperature either by visually reading a thread of mercury or the amplified, visually presented output of a thermocouple, and the like. These sensing mechanisms (sensors) are well known to those skilled in this art.

Commercially available instruments for the measurement of such characteristics often determine one parameter, e.g., hydrogen ion content, in one part of the instrument on a first portion of the specimen fluid and another parameter, e.g., dissolved gas content, on a second portion of the specimen. Dividing the sample is undesirable in terms of ease of manipulation and reproducibility and it would be advantageous to provide an apparatus to analyze at least two such characteristics on presentation of a single sample.

Conventional apparatus for the measurement of such characteristics usually contain their sensors in plastic chambers, and these are sometimes hidden from view within large external water baths for temperature control. The adverse gas solubility properties of many plastics, the poor visualization during use and the slow thermal response from external heat-exchange means are disadvantages in such types of prior art apparatus.

Commercially available fluid analyzers also require a considerable amount of skill to operate because samples must be introduced, calibrations must be made and rinsing and cleaning are necessary at appropriate times and places on the instrument. It would be advantageous, therefore, also to provide an apparatus which is adapted automatically to obtain specimens, calibration fluids and rinsing solutions from suitable storage locations, at appropriate times, and to measure and display, then record the results of the analysis, all with little or no need for the attention of an operator.

In the analysis of blood, the sample volume is often critical, and in the range of 0.1 to 0.4 cm.³ Commercial instruments are not readily adaptable to the measurement of such small volumes.

It is a principal object of this invention to overcome the above disadvantage and to provide the above-enumerated advantages with an improved apparatus which measures the characteristics of fluids, e.g., pH, dissolved gases and other medically related parameters, by means of electrochemical, photometric, visually readable, etc., sensors located along a single, continuously flowing liquid stream, and which includes an integral heat exchanging means.

One such apparatus — which, however, does not include an integral heat-exchanging means — has been described for use on flowing blood by E. E. Buzza et al. in Journal of the Association for the Advancement of Medical Instrumentation, Vol. 4, No. 4, July – Aug., 1970, p. 136–144, the disclosure of which is incorporated herein by reference.

The key component in the apparatus disclosed by Buzza et al is a sensor flow assembly comprising a polytetrafluoroethylene plastic block with a blood passage machined straight through. Buzza et al have pointed out that it is an essential feature of their new sensor flow assembly that all of the internal surfaces of the blood passage have been polished to a very smooth surface and abrupt changes in flow path have been avoided. They disclosed that such precautions were believed necessary to minimize the causes of turbulent flow and the consequent hemolysis of red blood cells.

Buzza et al also emphasized that their apparatus did not provide blood readings compensated to "normal 37°C. values." Buzza et al. reported that with their apparatus "considerably more information (hematocrit, oxygen saturation, base excess, etc.) and an integral computer would be needed to accomplish this."

Therefore, even though the Buzza et al apparatus provides "true" values of pH, $P_{CO_2}$ and $P_{O_2}$ in the flow cell at the temperature of the sample, such an apparatus does not provide directly the body temperature values (37°C.) most useful to the clinician.

Buzza et al reported preliminary work to overcome the temperature discrepancy using a small heater on the blood line (i.e., external to the plastic chamber) to raise the sample to 37°C., and succeeded in making the bench control measurements agree better with those provided by their apparatus, but observed that the use of an external heater is open to the same question and did not solve the problem.

The apparatus of the present invention overcomes the disadvantages of the prior art in a surprising and unexpected way to provide continuous analyses of fluids using as key features, means to provide turbulent flow at selected locations and means to integrally heat the sensor block whereby the readout will be automatically temperature compensated, i.e., the temperature of the specimen will provide the "normal 37°C. value" of recognized importance, or any other pre-selected value.

DESCRIPTION OF THE INVENTION

According to this invention there is provided an apparatus for measuring at least two of the following characteristics of a fluid: pH, partial pressure of dissolved gas or gases therein, inorganic ion concentration, hemoglobin and temperature, said apparatus comprising:

a. a vessel including a flow channel for fluid passing therethrough, said flow channel including integral means for inducing turbulent flow in said fluid in at least two locations;

b. an individual sensor for at least two of the following characteristics: pH, partial pressure of dissolved gas or gases, inorganic ion concentration, hemoglobin and temperature, each said sensor being located in said vessel along said channel and in proximity to a location of induced turbulent flow; and c. integral heat-exchanging means within said vessel for maintaining or achieving a pre-selected level both of the temperature of a fluid passing through said flow channel and the temperature of the sensors in said vessel.

The integral means for heat-exchange can comprise convection or conduction heaters and coolers, and the like, powered by electricity, steam, radiant energy, and the like. For convenience, it is preferred to use a core in the vessel which contains electrical heating means or provision for circulating coolant and heated fluids therethrough. In conjunction with such means, conventional temperature sensors, such as bimetallic switches, and the like can be used to control the heater/cooler elements.

In contrast to the glass or plastic materials of construction of the prior art analyzers, the preferred embodiments of the present invention will contain a relatively large amount of metal having a high heat transfer capability (relative to plastic, for example). Thus aluminum, stainless steel, and similar metals will be employed because they permit rapid heat flows therethrough and facilitate maintenance of the desired temperature at the sensors and in the fluid flow path. The only disadvantage in the use of metal, e.g., electrical interaction with the sensors, can easily be overcome by coating or lining all points of sensor contact with an insulating resin. In addition, any loss in thermal conductivity at the junction between metal parts or between metal and plastic parts can be largely overcome by using a thermally conductive cement, such as thermal epoxy.

A long felt need to provide fluid analyzers with rapid thermal response and accuracy of measurement due to precise control of heating is satisfied by the preferred embodiment of this invention wherein the heating means comprises, in combination, at least one cartridge resistance heater imbedded within the metallic structure of the vessel holding the sensors, a power supply, a sensor imbedded in the vessel for signalling temperature changes above and below a pre-selected level and a solid state relay for activating the heater (or heaters) when the vessel temperature falls below a pre-selected level and for deactivating the heater or heaters when the vessel temperature rises above a pre-selected level. This feature will be described in detail hereinafter (See also FIGS. 8 and 9).

Figure 4:
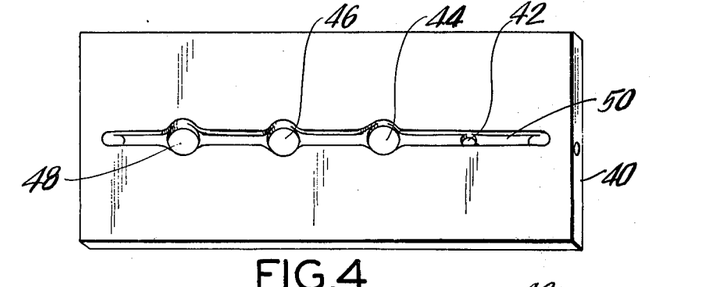
FIGS. 4–6 show semi-schematically flow channel plates including three different means for inducing turbulent flow in a liquid fluid flowing therethrough.
Figure 5:
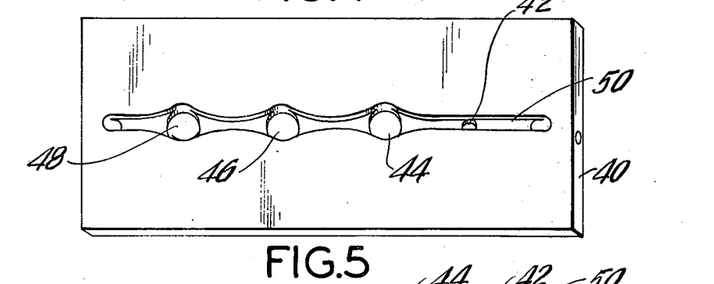
Figure 6:
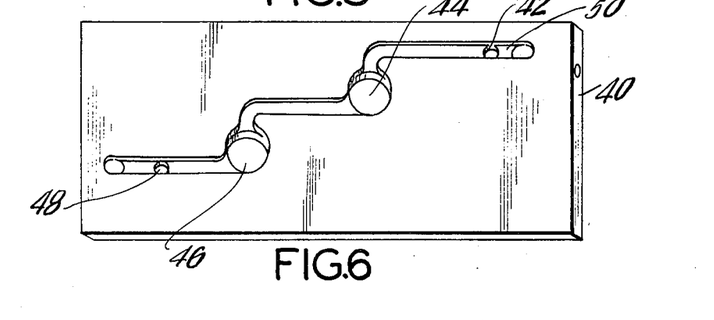

The integral means for inducing turbulent flow can comprise constrictions, baffles, screens, venturis, and similar impediments to laminar flow but one preferred means will comprise simply an abrupt change in direction, e.g., a 90° bend, in the flow channel (See FIG. 6). Another preferred such means will comprise an enlarged chamber or chambers in the flow channel, either somewhat abrupt, as shown in FIG. 4, or more streamlined, as shown in FIG. 5.

Turbulent flow permits more efficient measurement and rinsing and a reduction in overall dimensions and, contrary to the prior art teachings, hemolysis of blood cells is not a serious problem in the present design.

Accordingly, a preferred feature of the invention is to provide such an apparatus adapted to the measurement of blood, either in isolated samples or in an extracorporeal loop in which the blood is returned to the body after analysis. As will be obvious to those skilled in the art, for such purposes, the materials of construction will be selected to have minimum thrombogenicity and maximum ease of cleaning and sterilization.

The present apparatus is also uniquely adaptable to measurements of at least two of the enumerated parameters on very small amounts of blood. It is known, for example, that the sample volume is very critical, and the design of the sample chamber herein easily can be made to accommodate very small samples, e.g., of the order of 0.1 to 0.4 cm.$^3$ although higher volumes also can be used.

The parameters to be measured will constitute those above enumerated, the most useful of which are pH and the partial pressure of carbon dioxide and, optionally, the partial pressure of oxygen in the blood.

In such preferred embodiments, at least one of the sensors will be an electrochemical sensor, e.g., a glass electrode for pH (in conjunction with a conventional reference electrode, e.g., a KCl electrode) and for $P_{CO_2}$, and an amperometrically functional electrode, e.g., one based on a platinum cathode and a silver-silver chloride anode, for $P_{O_2}$.

In accordance with conventional practice, it is preferred to isolate each such sensor from the flowing fluid with an intermediate permeable, non-porous membrane, such as a thin, e.g., 0.01 to 5 mil, film of cellulose, rubber, polypropylene, polyorganosiloxane rubber, a block copolymer of a polyorganosiloxane and an aromatic polycarbonate, and the like.

In preferred embodiments, the apparatus will be at least partially transparent to provide visual access to the flow channel, so one can see if foreign substances or clots and the like are present, as well as being able to determine when sample changes, rinsing, calibration, and the like are complete. As will be described hereinafter, visual access is conveniently provided by using a glass cover plate to enclose part of the fluid flow channel.

According to another aspect of this invention (see FIG. 7) there is provided an apparatus for automatically analyzing at least two of the following characteristics of a fluid: pH, partial pressure of dissolved gas or gases therein, inorganic ion concentration, hemoglobin and temperature, said apparatus comprising:

a. holding means for storing a specimen fluid, a calibration fluid and a rinsing fluid;

b. transfer means for removing each said fluid from the storage means and dispensing the same;

c. measuring means for receiving each said fluid, said measuring means comprising
   i. a vessel including a flow channel for fluid passing therethrough;
   ii. an individual sensor for at least two of the following characteristics: pH, partial pressure of dissolved gas or gases, inorganic ion concentration, hemoglobin and temperature, each said sensor being located in said vessel along said channel;
   iii. integral heat exchanging means within said vessel for maintaining or achieving a pre-selected level both of the temperature of a fluid passing through said flow channel and the temperature of the sensors in said vessel;

d. means for driving a fluid through the apparatus; and e. electronic means for detecting and processing the output signals of the sensors, displaying and recording the characteristics of the fluid or fluids being measured.

In preferred embodiments, the integral heat exchanging means will comprise a solid state heating and controlling means, as described above.

Optionally, the apparatus can also include an external temperature exchanging means, e.g., to pre-heat a chilled specimen, e.g., blood at 0°–4°C., before it enters measuring means (c). Such embodiments will yield very rapid and stable temperature responses, e.g., a 1 cm.$^3$ sample at 5°C. will reach 36.5°C. in 13.8 sec. with a pre-heater and will require 22.2 sec. without a pre-heater.

A preferred feature of such an apparatus is to provide portability in the measuring means. If this part of the apparatus is small enough and light enough, it can be disconnected and taken, for example, into the room of a patient and the fluid specimen can be drawn directly from the patient into the vessel without exposing him to an electrical shock and without the need to draw the sample into a heparinized syringe, ice it, deliver the same to a laboratory, then transfer the sample to the analyzer. The apparatus described herein is readily adaptable to construction of the measuring means in a block form having the small size needed for this embodiment, e.g., about 3 inches maximum dimension.

Another preferred feature (illustrated by labeled rectangular box "GAS" in FIG. 7) is to adapt the transfer means (b) to dispense a gas, e.g., air or nitrogen, as well as a fluid and then to provide that the flow channel in the measuring means (c) is normally substantially horizontal, but movable to provide that when a liquid fluid in the flow channel is being displaced by a gas, the downstream exit port in said vessel is disposed below the level of the upstream entrance port and when a gas in the flow channel is being displaced by a liquid fluid, the downstream exit port in said vessel is disposed above the level of the upstream entrance port.

Flow through the channels is turbulent due to sudden changes in direction and/or cross section. Therefore, a considerable amount of undesired mixing of specimens will take place if in changing liquids one does not replace the first liquid with a gas, e.g., air, and subsequently, the air with a second liquid. In addition, it is advisable to use the force of gravity to prevent gas bubbles from passing through the fluid by orienting the vessel so that the flow is inclined toward the vertical and both the filling and emptying are from below. This problem is solved by rotating the measuring means through an angle of about 90° so that when a liquid fluid is being replaced by a gas, the channel is oriented about 45° from vertical with the exit port down and when a gas is being replaced by a liquid fluid, the channel is oriented about 45° from the vertical with the exit port up.

In preferred features, the holding means will comprise a conventional chamber, preferably anaerobic and having a controlled inside temperature. Its storage capacity should comprise at least one package of specimen fluid and at least one package of calibration fluid, which may, in some cases, also be used as a rinsing fluid.

A suitable means for transferring the specimen fluid, the calibration fluid and/or the rinsing fluid can comprise a movable tubular probe and a conduit on one end of said probe and in open communication downstream with said measuring means, said probe being insertable at predetermined intervals into an opened package of specimen fluid, calibration fluid or rinse fluid.

The propulsion means can be located at any point along the fluid flow path, either just before disposal to waste or the line to recycle to the patient (FIG. 7) or upstream from the measuring means, for example. By way of illustration, the moving fluids can be driven through the system in the direction shown by the arrow in FIG. 7 using a peristaltic pump operating on a flexible portion of the fluid conduit at the rate of the order of 1 cc./min.

Figure 7:
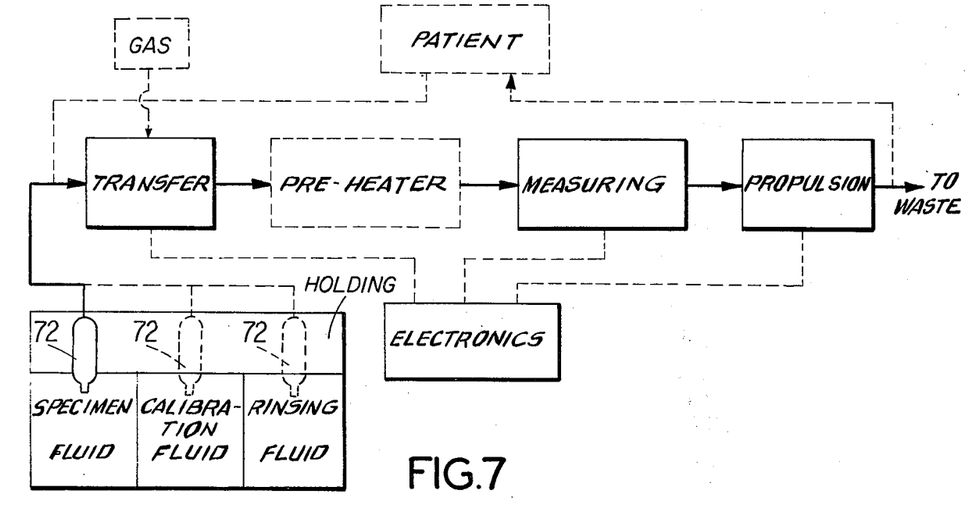
FIG. 7 shows in block diagram form an apparatus according to this invention for continuously and automatically measuring the characteristics of specimen fluids passing therethrough.

In the arrangement shown in FIG. 7, the pressure in the fluid stream is slightly less than atmospheric and this may put a slight stress on any membranes used with the sensors. If this occurs, the pump can be located upstream of the sensors and a substantially non-porous flexible conduit will be selected for use with the pump to preclude gas diffusion at this location.

The electronic means for amplifying the signals from the sensor will be conventional and readily understandable to those skilled in the art. For example, industrial pH amplifiers will be used with the high impedence sensors (pH, $P_{CO_2}$ and $P_{O_2}$) and the amplified signals can be transmitted to a trend recorder which will display and record the signal.

When desired, the pump speed can be programmed to vary the time in rinsing and filling the system and to reduce the sample size required by slowing the rate of propulsion during the measurement phase. The procedure for adjusting the electronics to maintain calibration relative to one or more calibration fluids may also be accomplished manually, e.g., by adjusting potentiometers, or automatically, e.g., through the use of servo loops, as will be understood by those skilled in the art.

DESCRIPTION OF THE PREFERRED EMBODIMENTS

Figure 1:
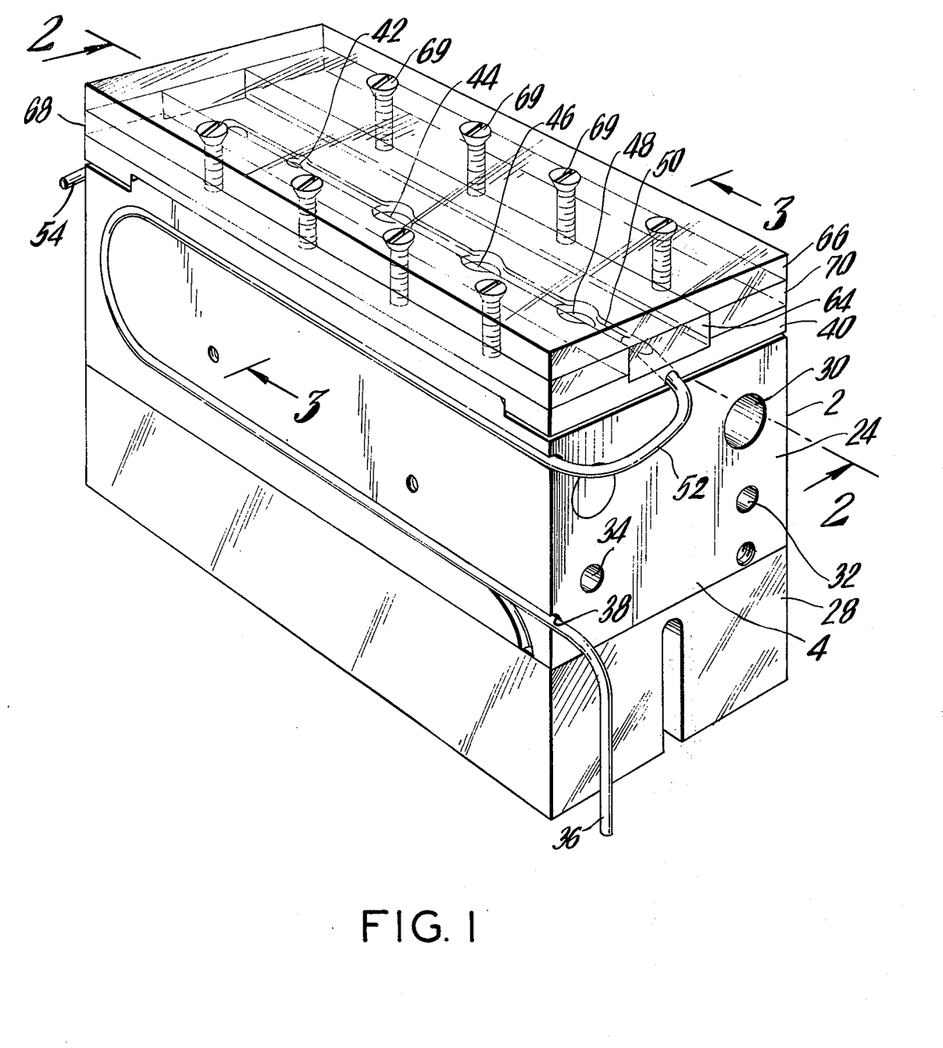
In FIG. 1 is illustrated a perspective view of an apparatus for analyzing fluids according to this invention.
Figure 2:
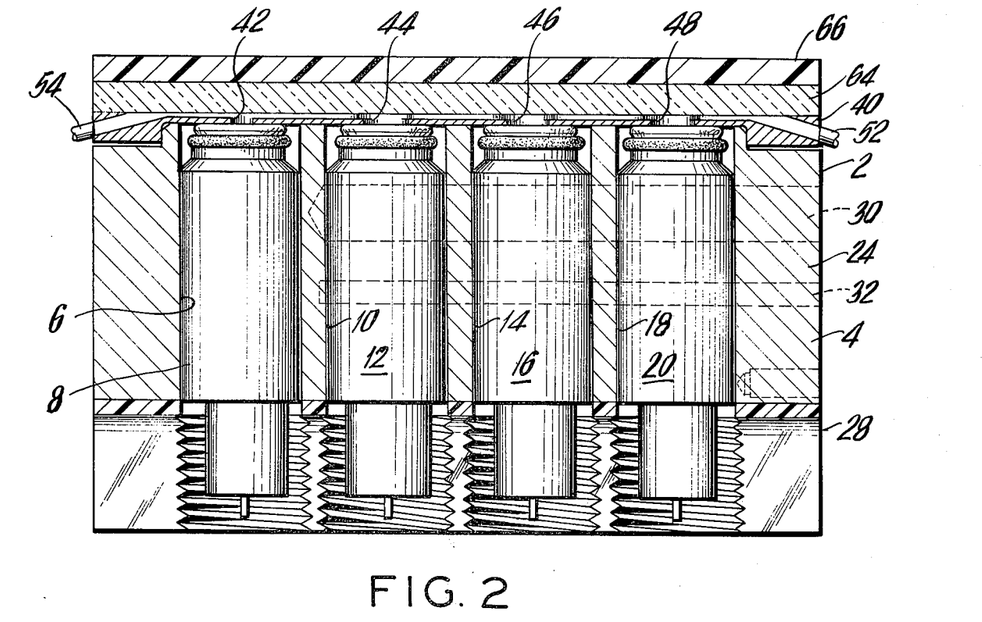
FIG. 2 is a vertical cross-sectional view of the apparatus of FIG. 1, along lines 2—2, and shows four sensors in place.
Figure 3:
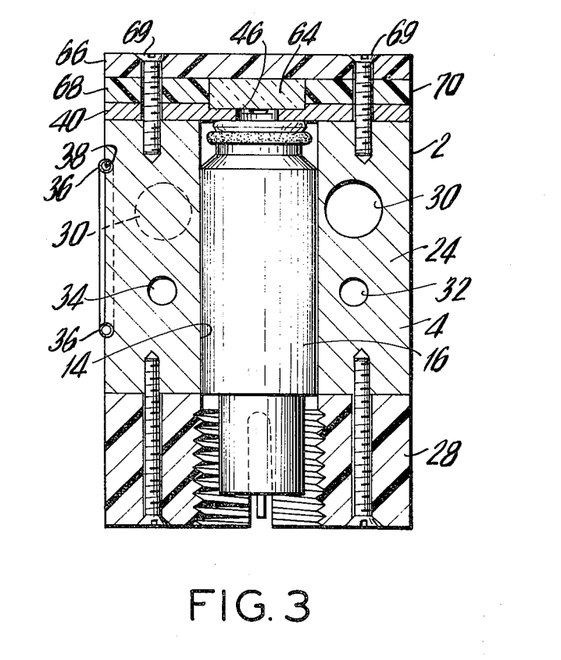
FIG. 3 is a vertical cross-sectional view of the apparatus of FIG. 1, along line 3—3.

In FIGS. 1–3 are shown three views of sample chamber device 2, comprising multi port block 4 having keyed aperture 6, for mounting electrochemical sensor 8 comprising a pH reference electrode, e.g., a KC1 electrode, aperture 10 for mounting sensor 12 comprising a glass electorde for pH determination, aperture 14 for mounting sensor 16 comprising a glass electrode for $P_{CO_2}$ determination and aperture 18 for mounting sensor 20 such as an amperometrically functional platinum-silver-silver chloride electrode for $P_{O_2}$ determintaion. Other apertures and sensors may be included or substituted for those shown.

The sensitive faces of sensors 8, 12, 16 and 20 are interconnected through a specially designed, essentially chemically inert fluid pathway of the designs shown, for example, in FIGS. 4–6, the embodiment of FIGS. 1–3 being illustrated in FIG. 4.

Block 4 has a relatively large part of its body comprised of metal portion 24 having high heat conductive capacity, such as aluminum, stainless steel and the like, and an insulating resinous coating or insert in each of the slotted apertures 6, 10, 14 and 18 to provide electrical isolation when the keyed electrochemical sensors are inserted therein. Block 4 also includes optional plastic back portion 28, e.g., of acrylic or polycarbonate resin, and the like, which contains the threads in the apertures and also is useful to maintain electrical isolation. Aperture 30 are provided in metal portion 24 to accept one or more temperature regulating sensors (not shown) and apertures 32 and 34 are provided to permit entry and exit of heat transfer means, such as electrical resistance heaters or cooling and heating fluids, to provide thermostatting, such as at 37°C. Small diameter, low volume hold up metal heat-exchange tube 36 attaches integrally to block 4 and is partially buried therewithin in grooved slot 38. Passage of a liquid specimen through tube 36 facilitates measurement at the pre-selected block temperature, especially if a cold sample, e.g., blood at 0°–4°C. is presented for analysis at 37°C.

Attached, e.g., by bolting, to the metal portion of block 4 is plate 40, using a thermal cement, if desired, such as thermal epoxy at the interface to facilitate heat transfer therebetween. Plate 40 includes a fluid pathway (shown more clearly in FIGS. 4 through 6) comprising apertures 42, 44, 46 and 48 for exposing respectively, the faces of sensors 8, 12, 16 and 20. Plate 40 also includes a streamlined machined pathway 50 which interconnects apertures 42, 44, 46 and 48 and the sensor faces, providing turbulent but bubble free flow and easy cleanup. Plate 40 also includes inlet port 52 and outlet port 54 for introduction and removal of specimen fluid, calibration fluid, rinsing fluid and intermediate quantities of gas, e.g., air. Plate 40 has a smooth lower face against which are seated the sensors on intermediate membranes.

Above plate 40 is fixed cover plate 64, preferably transparent and made of glass. Cover plate 64 can be mechanically fixed, e.g., by bolting, or cementing, e.g., with epoxy cement directly to plate 40. Glass, which is preferred, will complete the flow chamber and provide an inert cover providing visual access thereto. This permits the operator to determine if bubbles or clots are present directly above the respective sensors. If such are present, erratic results are sometimes noted.

Fixed to the side of block 4 and partially imbedded in machined groove 38 is pre-heater 36, which comprises a tube for thermally equilibrating the fluid during passage therethrough prior to entry through inlet port 52 into the sensing chamber. Because this design provides thermal contact between the fluid sample and the metal vessel, it insures rapid heating and, consequently, better accuracy in temperature-sensitive analyses.

By way of illustration, the efficacy of pre-heater 36 was demonstrated by mounting a thermocouple in a heated chamber cycled over a range of 0.3°C. and monitoring the "sample temperature." Samples of saline solution at 5°C. and 25°C. were injected into the analyzer through a pre-heater (5.3 inches long × 0.030 inch I.D. stainless steel tubing), and also injecting, but bypassing the preheater. The time required to reach 35°C., 36.5°C and to return to a steady reading was measured. The data are recorded in Table 1:

Table 1

Effect of Pre-heater on Temperature Response in Fluid Analyzer

| Sample size | Without preheater | | | | With preheater | | | |
|---|---|---|---|---|---|---|---|---|
| | 1 cm³ | | 2 cm³ | | 1 cm³ | | 2 cm³ | |
| Sample Temp.,°C. | 25 | 5 | 25 | 5 | 25 | 5 | 25 | 5 |
| Chamber Temp., before sample introduced, °C. | 38.5 | 38.5 | 38.7 | 38.6 | 38.5 | 38.4 | 38.5 | 38.4 |
| Chamber Temp., minimum after sample introduction | 32.0 | 27.3 | 30.0 | 22.5 | 35.1 | 33.2 | 33.3 | 28.7 |
| Time for sample to reach 35°C. (sec.) | 7.2 | 15 | 13.8 | 26.4 | — | 7.2 | 10.2 | 18 |
| Time for sample to reach 36.5°C. (sec.) | 15.4 | 22.2 | 22.2 | 39 | 8.4 | 13.8 | 18 | 29 |
| Time for chamber to return to steady temp. (sec.) | 69 | 103 | 78 | 124 | 48 | 66 | 76 | 112 |

Thus the beneficial effect of the pre-heater in yielding stable and rapid temperature responses is shown, by decreases of as much as 50 percent in response time.

Figure 8:
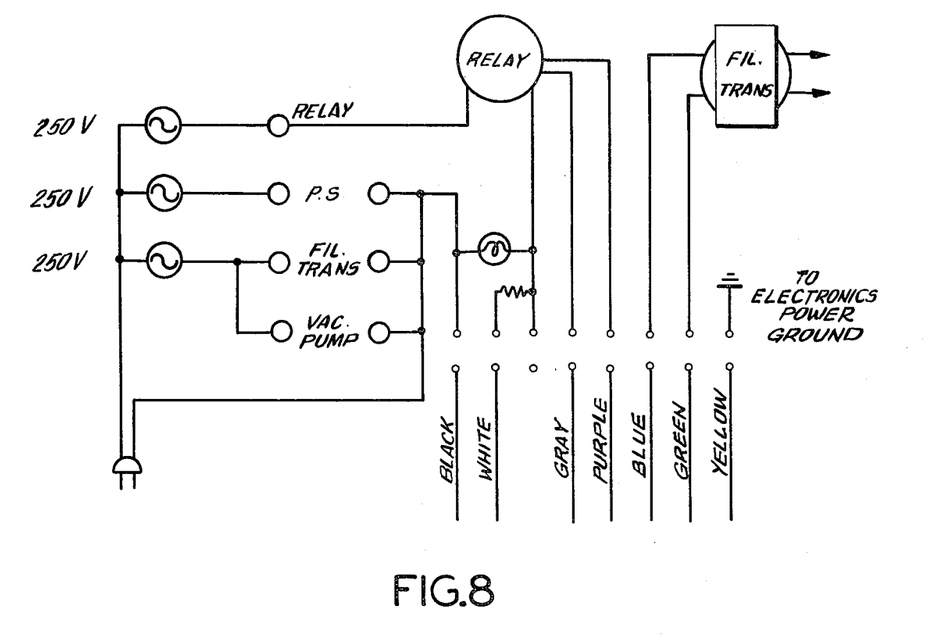
FIGS. 8 and 9 show in semi-schematic form the electrical layout or solid state heating and controlling means for the preferred embodiments of this invention.
Figure 9:
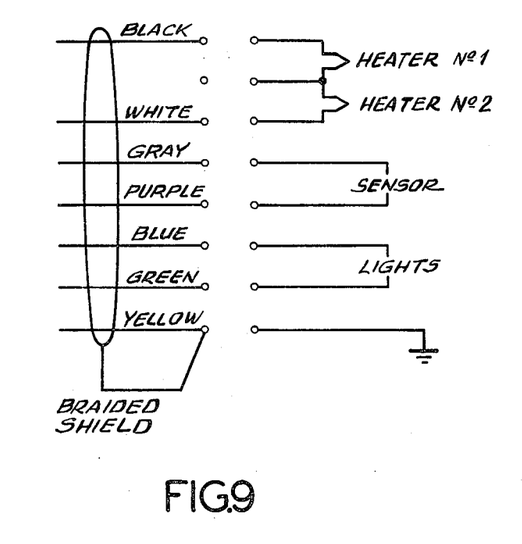

In FIGS. 8 and 9 are shown an electrical layout of a very effective system for providing thermal regulation with solid state heating and controls. The apparatus of FIGS. 1–3 is provided with apertures to accept the thermal sensor and at least one, and preferably two cartridge heaters. Those skilled in the art will be able to select suitable components, but for purposes of illustration, the thermal sensor can be a mercury column device of suitable sensitivity, e.g., with a pre-determined set point of 37°C. ± 0.05°C. or any other conventional temperature, for example, a PRINCO, Model T-148, (Philadelphia Scientific Co.). The relay can be a solid state PRINCO Model T-166 MO-STAT, or equivalent. The cartridge type heater can be a HOTWATT Model 7112, 15 Watt, 115 volt AC, ⅛ inch diameter, or equivalent. As can be seen by inspection of FIG. 8, a 1K dropping resistor is used as a voltage control and, with the circuit shown, when the mercury column in the sensor drops below the set point, the relay closes activating 110 volts AC to the heaters. When the set point rises, the AC voltage is interrupted by opening of the relay.

The assembly of FIGS. 1–3 is completed by providing optional plastic pressure plate 66 and spacers 68 and 70. These are fastened, e.g., with bolts 69, to the metal portion of block 4, and prevent cover plate 64 from flexing when the sensors are seated in their respective apertures.

The following illustrates a typical procedure for using the above-described assembly to analyze pH and dissolved gases in blood. The overall dimension of the block is about 3½ inches between inlet and outlet ports. Because the associated components are well known functional devices, they are illustrated in block diagram form in FIG. 7. Upon delivery of a blood sample to the instrument for analysis, it is stored in an anaerobic chamber and maintained at a temperature of 0° to 4°C. Also stored are quantities of one or two liquid calibration standards, e.g., 1.521 g./l. of sodium bicarbonate in isotonic saline equilibrated with 10.02% $CO_2$ in nitrogen, or 1.9108 g./l. of sodium bicarbonate equilibrated with 4.80% $CO_2$, 11.62% $O_2$, balance $N_2$, by weight. See Wilfore, U.S. Pat. No. 3,681,255 for further description of such calibration fluids. Also stored is a quantity of a rinse solution suitable for providing a continuous fluid flow through the apparatus between specimen analysis. The calibration fluid may also be used as a rinsing fluid.

The preferred transfer function is performed by moving a hypodermic needle-like tubular probe 72, FIG. 7 between the package of specimen, calibration fluid and rinse. Between times the probe is suspended in air or other gas allowing a volume of gas to separate the various fluids. The moving stream is driven through the system as shown by the arrows with a peristaltic (wave motion) pump operating on a flexible portion of the conduit.

The measurements are made in the apparatus component described in detail hereinabove.

Conventional electronics are used to detect the sensor outputs, process the signals, display the results, record the results and control the timing of the intake function. Because these are well known to those skilled in the art of instrument design and construction, they will not be described herein.

When the apparatus is assembled, calibrated and maintained in good working order, precise and reproducible measurements are made on flowing liquid samples (including blood), to within very close tolerances on pH, $P_{CO_2}$, $P_{O_2}$ and other medically useful parameters. The results are much more useful than those of many devices in the prior art because of the internal temperature compensation feature of the instant apparatus. With careful attention to the design of the fluid flow path as described above, turbulent flow which increases measurement efficiency and freerinsing can be achieved and accommodated without hemolysis of red cells in blood samples. Very small samples, e.g., 0.1–0.4 cm.$^3$, can be accommodated with facility.

From the foregoing description and accompanying drawings it is obvious that a useful apparatus has been provided for analyzing fluids. Although the apparatus has been described with reference to blood gas analysis, it is also intended for other such fluids. Obvious modifications will suggest themselves to those skilled in the art.

The invention is not to be limited by the above description but is to be defined only by the appended claims.

We claim:

1. An apparatus for measuring at least two of the following characteristics of a fluid: pH, partial pressure of dissolved gas or gases therein, inorganic ion concentration, hemoglobin and temperature, said apparatus comprising:
    a. a vessel including a flow channel for fluid passing therethrough, said flow channel including integral means for inducing turbulent flow in at least two locations therein during the measuring of the characteristics of said fluid;
    b. at least two sensing means, each said sensing means being located within said channel and in proximity to one of said means for inducing turbulent flow; and
    c. integral heat-exchanging means within said vessel for maintaining or achieving a preselected level of the temperature of a fluid passing through said flow channel and the sensing means in said vessel.

2. An apparatus as defined in claim 1 wherein said integral means for inducing turbulent flow in said fluid comprises an abrupt change of direction of the flow channel.

3. An apparatus as defined in claim 1 wherein said integral means for inducing turbulent flow in said fluid comprises an enlarged chamber in said flow channel at each of said locations.

4. An apparatus as defined in claim 1 wherein said integral means for inducing turbulent flow in said fluid comprises both an abrupt change of direction of the flow channel and an enlarged chamber in said flow channel at each of said locations.

5. An apparatus as defined in claim 1 wherein at least one of said sensing means is an electrochemical sensor and intermediate said sensor and said flow channel is a permeable, non-porous membrane.

6. An apparatus as defined in claim 1 wherein said vessel is at least partially transparent so as to provide visual access to the flow channel for fluid passing therethrough.

7. An apparatus as defined in claim 1 which includes individual sensing means for blood pH, sensing means for dissolved gas in blood, and sensing means for inorganic ion concentration in blood.

8. An apparatus as defined in claim 7 in which the volume of said flow channel is selected to provide for measurement of quantities of blood within the range of 0.1 to 0.4 cm.$^3$.

9. An apparatus as defined in claim 7 which includes a first sensing means comprising an electrochemical sensor for the determination of pH in blood and a second sensing means comprising an electrochemical sensor for the determination of partial pressure of carbon dioxide in blood.

10. An apparatus as defined in claim 9 which also includes a third sensing means comprising an electrochemical sensor for the determination of the partial pressure of oxygen in blood.

11. An apparatus as defined in claim 1 wherein said integral heat-exchanging means is a heating means.

12. An apparatus as defined in claim 11 wherein said vessel is constructed substantially of metal having a high heat transfer capability and the integral heating means is embedded within the metallic structure of said vessel.

13. An apparatus as defined in claim 12 wherein said integral heating means comprises an electrical resistance heater and an external power supply or a closed pathway for conducting a heat transfer fluid therethrough and an external means to heat said fluid.

14. An apparatus as defined in claim 13 wherein said integral heating means comprises, in combination, at least one electrical cartridge resistance heater imbedded within the metallic structure of said vessel, a power supply, a sensor imbedded in said vessel for signalling temperature changes above and below a pre-selected level and a solid state relay for activating the heater or heaters when the vessel temperature falls below a pre-selected level and for deactivating the heater or heaters when the vessel temperature rises above a pre-selected level.

15. An apparatus for automatically analyzing at least two of the following characteristics of a fluid: pH, partial pressure of dissolved gas or gases therein, inorganic ion concentration, hemoglobin and temperature, said apparatus comprising:
   a. plural holding means for individually storing a specimen fluid, a calibration fluid and a rinsing fluid;
   b. transfer means for removing each said fluid from the storage means and dispensing the same;
   c. measuring means for receiving each said fluid, said measuring means comprising
     i. a vessel including a flow channel for fluid passing therethrough said flow channel including integral means for inducing turbulent flow in at least two locations therein during the measuring of the characteristics of said fluid;
     ii. at least two sensing means, each said sensing means being located within said channel and in proximity to one of said means for inducing turbulent flow; and
     iii. integral heat exchanging means within said vessel for maintaining or achieving a pre-selected level of the temperature of a fluid passing through said flow channel and the sensing means in said vessel;
   d. propulsion means for driving a fluid through the apparatus; and
   e. electronic means for detecting and processing the output signals of the sensors, displaying and recording the characteristics of the fluid or fluids being measured.

16. An apparatus as defined in claim 15 which also includes temperature exchanging means for preheating a fluid between transfer means (b) and measuring means (c).

17. An apparatus as defined in claim 15 wherein in said measuring means (c), said vessel is constructed substantially of a metal having a high heat transfer capability and the integral heat exchanging means comprises, in combination, at least one electrical cartridge resistance heater imbedded within the metallic structure of said vessel, a power supply, a sensor imbedded within said vessel for signalling temperature changes above and below a pre-selected level and a solid state relay for activating the heater or heaters when the vessel temperature falls below a pre-selected level and for deactivating the heater or heaters when the vessel temperature rises above a pre-selected level.

18. An apparatus as defined in claim 15 wherein said transfer means (b) includes means to dispense a gas and wherein the flow channel in said measuring means (c) is normally substantially horizontal, but movable to provide that when a liquid fluid in the flow channel is being displaced by a gas, the exit port in said vessel is disposed below the level of the entrance port and when a gas in the flow channel is being displaced by a liquid fluid, the exit port in said vessel is disposed above the level of the entrance port.

19. An apparatus as defined in claim 15 wherein said plural holding means comprises an anaerobic chamber for at least one specimen fluid and an anaerobic chamber for at least one calibration fluid and means for regulating the inside temperature of each said chamber.

20. An apparatus as defined in claim 15 wherein said transfer means comprises a moveable tubular probe and a conduit on one end of said probe and in open communication downstream with said measuring means, said probe being insertable at predetermined intervals into an opened package of specimen fluid, calibration fluid or rinse fluid.

21. An apparatus as defined in claim 15 wherein said propulsion means comprises a conduit for said fluid said conduit having a flexible portion and a peristaltic pump operating on said flexible portion.

22. An apparatus as defined in claim 15 wherein said electronic means comprises an amplifier for the signal from each sensor coupled to means to display and record the amplified signal.

23. An apparatus as defined in claim 15 which includes individual sensing means for blood pH, sensing means for dissolved gas in blood, and sensing means for inorganic ion concentration in blood.

24. An apparatus as defined in claim 23 in which the volume of said flow channel is selected to provide for measurement of quantities of blood within the range of 0.1 to 0.4 cm.$^3$.

25. An apparatus as defined in claim 23 wherein said measuring means is detachable from said apparatus and transportable to an apparatus-remote location for receiving a blood specimen drawn directly from the patient into the flow channel in said measuring means.

* * * * *